2,832,670

PROCESS FOR THE DECOMPOSITION OF PHOSGENE

Heinz Wolithan, Leverkusen-Wiesdorf, Germany, assignor to Farbenfabriken Bayer Aktiengesellschaft, Leverkusen, Germany, a corporation of Germany No Drawing. Application January 13, 1954
Serial No. 403,929

5 Claims. (Cl. 23—154)

This invention relates to a process of decomposing phosgene.

It is a customary process to destroy or decompose gaseous phosgene by washing with alkalies. The comparatively large quantities of alkali consumed thereby render this process uneconomic even if the washing liquor is recycled. The economy of this prior art method is further reduced by the power consumption of the pumping equipment, which is required for the circulation of the alkaline washing liquor.

The principal object of this invention is to provide a simple and economic method of decomposing phosgene in large scale operations.

Further objects will become apparent as the following description proceeds.

In accordance with the present invention we have found that phosgene can be decomposed by intimately contacting it with activated carbon and water. The complete decomposition of phosgene according to the invention is accomplished by carrying out the herein described process under carefully controlled conditions. At first, a definite minimum quantity of activated carbon is required to decompose quantitatively a given amount of phosgene. In general, one volume of activated carbon is capable of decomposing about 40–70 volumes of phosgene. Furthermore, water must be applied in such a proportion to the quantity of phosgene to be decomposed that the concentration of the hydrochloric acid formed during hydrolysis of phosgene does not exceed substantially 10%. A higher concentration of the hydrochloric acid prevents the complete hydrolysis of phosgene. The amount of water used should preferably be at least eight parts by weight per part by weight of phosgene.

The process of the invention can be carried out for instance by passing the gaseous phosgene to be decomposed, even when it is present in admixture with other waste gases, into the bottom of a tower filled with activated carbon, and introducing an appropriate quantity of water through the top of this tower. The amount of phosgene, which can be decomposed per hour, depends on the size of the tower.

According to a preferred embodiment of the invention the decomposition of phosgene is carried out either in several towers, which are connected in series, or—especially as far as units of larger dimensions are concerned—in towers, which are subdivided into several compartments, each subcompartment, which is filled with activated carbon of for instance 1 meter height, being provided with separate water supply means. This arrangement allows of ensuring a very uniform irrigation of the activated carbon with water. The activity of the activated carbon is not affected by the presence of inert gases in the waste gases streaming through the activated carbon. Any organic solvent vapors contained in the waste gases are preferably removed beforehand by appropriate methods, for instance by cooling or washing with water. If, notwithstanding, a reduction of the activity of the activated carbon is brought about due to improper working the full activity can easily be restored by blowing steam through the activated carbon.

By adhering to the above described conditions phosgene is destroyed without residue by quantitative decomposition into carbonic acid and hydrochloric acid.

I claim:

1. Process for the decomposition of phosgene which comprises contacting phosgene with liquid water in the presence of a sufficient amount of activated carbon to cause the liquid water to hydrolyze the phosgene to hydrochloric acid and carbonic acid, said water being present in amount sufficient to maintain a concentration of the hydrochloric acid formed by the hydrolysis below about 10%.

2. Process according to claim 1, in which said contacting is effected with at least 8 parts by weight of water per part by weight of phosgene.

3. Process according to claim 2, in which said contacting is effected with about 40–70 parts by volume phosgene per part by volume of activated carbon present.

4. Process according to claim 1, in which said contacting is effected with about 40–70 parts by volume of phosgene per part by volume of activated carbon present.

5. Process for the decomposition of phosgene which comprises contacting phosgene with at least 8 parts by weight of liquid water in the presence of activated carbon to thereby hydrolyze the phosgene to hydrochloric acid and carbonic acid, said activated carbon being present in amount of about $1/40$–$1/70$ of the volume of phosgene.

References Cited in the file of this patent

UNITED STATES PATENTS

| 1,843,196 | Behrman | Feb. 2, 1932 |
| 1,943,920 | Lacell | Jan. 16, 1934 |
| 2,196,246 | Brown et al. | Apr. 9, 1940 |

OTHER REFERENCES

TM 3–205, October 9, 1951; pages 3, 5 and 25–29.

"A Course in General Chemistry," third ed., 1927, pages 163, 164 and 432. Authors W. McPherson and W. E. Henderson, Ginn and Co., N. Y.

J. W. Mellor's "A Comprehensive Treatise on Inorganic and Theoretical Chem.," vol. 5, 1924 ed., page 967, Longmans, Green and Co., N. Y.